(12) United States Patent
Bolmer et al.

(10) Patent No.: US 12,226,046 B2
(45) Date of Patent: Feb. 18, 2025

(54) DISPOSABLE BABY BOTTLE WARMER FOR USE ANYWHERE

(71) Applicant: Tempra Technology, Inc., Bradenton, FL (US)

(72) Inventors: Michael Sheppard Bolmer, Harleysville, PA (US); Alan James Maskell, Grittleton (GB); Cullen M. Sabin, Bradenton, FL (US); Corey R. Blanchette, Sarasota, FL (US)

(73) Assignee: Tempra Technology, Inc., Bradenton, FL (US)

(*) Notice: Subject to any disclaimer, the term of this patent is extended or adjusted under 35 U.S.C. 154(b) by 443 days.

(21) Appl. No.: 17/602,445

(22) PCT Filed: Apr. 15, 2020

(86) PCT No.: PCT/US2020/028347
§ 371 (c)(1),
(2) Date: Oct. 8, 2021

(87) PCT Pub. No.: WO2020/214727
PCT Pub. Date: Oct. 22, 2020

(65) Prior Publication Data
US 2022/0211211 A1    Jul. 7, 2022

Related U.S. Application Data

(60) Provisional application No. 62/834,501, filed on Apr. 16, 2019.

(51) Int. Cl.
*A47J 36/24*    (2006.01)
*A47J 36/28*    (2006.01)

(52) U.S. Cl.
CPC ........... *A47J 36/28* (2013.01); *A47J 36/2422* (2013.01)

(58) Field of Classification Search
CPC ..... A47J 36/28; A47J 36/2411; A47J 36/2422
USPC ............ 126/263.01, 263.05, 263.06, 263.07, 126/263.08, 263.09, 263.1
See application file for complete search history.

(56) References Cited

U.S. PATENT DOCUMENTS

| | | | |
|---|---|---|---|
| 2,844,141 A * | 7/1958 | Daugherty | A47J 47/14 D7/703 |
| 3,756,389 A | 9/1973 | Firth | |
| 3,804,076 A | 4/1974 | Fant et al. | |
| 4,265,216 A * | 5/1981 | Marshall | F24V 30/00 126/263.07 |
| 4,501,259 A * | 2/1985 | Apellaniz | C09K 5/16 126/263.09 |
| 6,234,165 B1 | 5/2001 | Creighton et al. | |

(Continued)

OTHER PUBLICATIONS

International Search Report for PCT/US20/28347, dated Jul. 23, 2020.

*Primary Examiner* — Avinash A Savani
(74) *Attorney, Agent, or Firm* — Sheehan Phinney Bass & Green PA

(57) ABSTRACT

A heating device includes a flexible housing that defines a plurality of heater segments. Each heater segment includes a first compartment containing a first reactant, a second compartment containing a second reactant, and a frangible seal between the first compartment and the second compartment. The first reactant and the second reactant are configured to react exothermically upon contact with one another.

24 Claims, 8 Drawing Sheets

(56) References Cited

U.S. PATENT DOCUMENTS

| | | | | |
|---|---|---|---|---|
| 6,248,257 | B1* | 6/2001 | Bell | C09K 5/18 |
| | | | | 126/263.01 |
| 6,644,383 | B2* | 11/2003 | Joseph | B65D 81/3897 |
| | | | | 126/263.01 |
| 6,827,080 | B2* | 12/2004 | Fish | A61F 7/03 |
| | | | | 126/263.01 |
| 2010/0126492 | A1 | 5/2010 | St. Etienne | |
| 2010/0300426 | A1 | 12/2010 | Madan et al. | |
| 2011/0126821 | A1* | 6/2011 | Wilson | A47J 36/28 |
| | | | | 126/263.01 |
| 2011/0188787 | A1 | 8/2011 | Cho et al. | |
| 2014/0358206 | A1 | 12/2014 | Hirokane et al. | |

\* cited by examiner

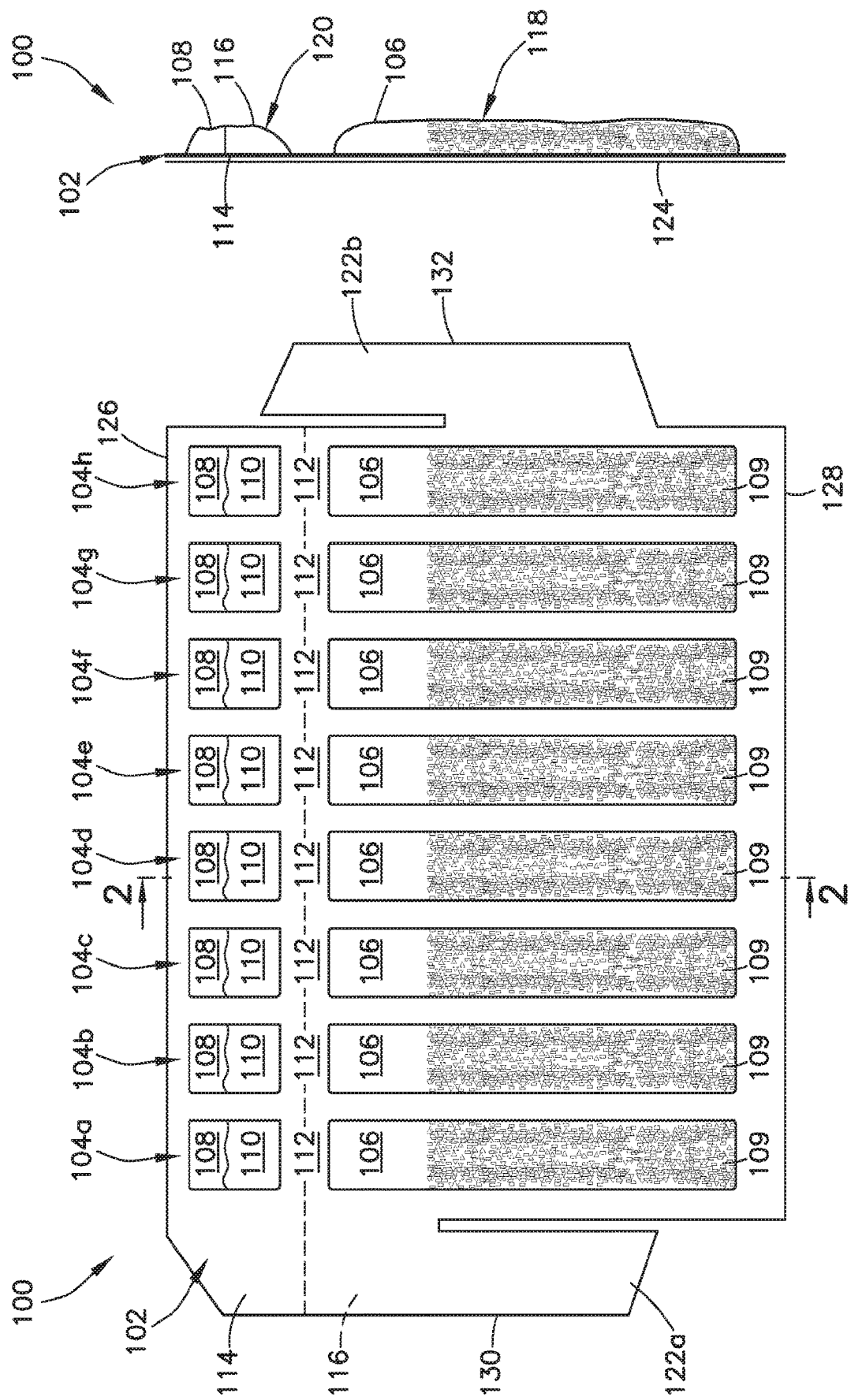

DISPOSABLE BABY BOTTLE WARMER FOR USE ANYWHERE

CROSS-REFERENCE TO RELATED APPLICATION(S)

This application is a national stage application, filed under 35 U.S.C. § 371, of International Application No. PCT/US20/28347, filed Apr. 15, 2020, which claimed the benefit of U.S. Provisional Patent Application No. 62/834,501, filed Apr. 16, 2019. The contents of the prior applications are incorporated by reference herein in their entireties.

FIELD OF THE INVENTION

This application relates to a wrap-around heater and more particularly relates to a wrap-around heater for heating a baby bottle and other heating technologies.

BACKGROUND

There are a wide variety of heaters in the world, many of which may be used for heating baby bottle formula. U.S. Pat. Nos. 3,804,076 and 6,234,165 disclose two examples of prior baby bottle heaters.

SUMMARY OF THE INVENTION

In one aspect, a heating device includes a flexible housing that defines a plurality of heater segments. Each heater segment includes a first compartment containing a first reactant, a second compartment containing a second reactant, and a frangible seal between the first compartment and the second compartment. The first reactant and the second reactant are configured to react exothermically upon contact with one another.

In another aspect, a heating device includes a first compartment containing a granular first reactant, a second compartment containing a liquid second reactant, and a frangible seal or other flow control mechanism (e.g., a valve or the like) between the first compartment and the second compartment. The granular first reactant and the liquid second reactant are configured to react exothermically upon contact with one another. A coating of oil is on a portion (i.e., some but not all) of the granular first reactant in the first compartment.

In yet another aspect, a method includes providing a heating device and wrapping the heating device around a container (e.g., a baby bottle) that contains a material (e.g., milk or formula) to be heated by the heating device. The heating device includes a flexible housing that defines a plurality of heater segments. Each heater segment has a first compartment containing a first reactant, a second compartment containing a second reactant, and a frangible seal between the first compartment and the second compartment. The first reactant and the second reactant are configured to react exothermically upon contact with one another.

In some implementations, one or more of the following advantages are present.

For example, in various implementations, each heating device disclosed herein acts as a pad capable of providing heat on demand. It can wrap around a bottle and be fastened in place (e.g., with a hook-and-loop, adhesive fastener, or mechanical hook of material), then actuated. After use, it is simply removed from the bottle and disposed of in any ordinary waste bin.

The heating systems are safe and produce innocuous residue.

Moreover, in some implementations, performance of the heating system can be tailored to different applications (e.g., by adjusting the portion of oil-coated granular reactant in the heating system, and/or changing the amounts of reactants in the heating system).

The heating device can be easily rolled (or wrapped around a container, e.g., a baby bottle) while maintaining the granule distribution uniform around the circumference. This uniform distribution is met by providing the heater in discrete segments. There can be as many or as few segments as desired. Moreover, since the heater has thickness, in order that it can be rolled either the outside surface or the inside surface must change length. By use of the segmented design the inner side can collapse along the seals between the segments, allowing the heater pouches to move closer together, decreasing the area of unheated bottle circumference.

When the heating device is applied to a bottle (as seen in FIG. 7), the granule pouches are pressed tightly against the wall of the bottle containing the material to be heated. The liquid pouches are then squeezed to break the frangible seals and the heating reaction starts. It may be noticed that in very warm weather it may be desirable to initiate less than the maximum number of heaters.

Other features and advantages will be apparent from the description and drawings, and from the claims.

BRIEF DESCRIPTION OF THE DRAWINGS

FIG. 1 is a schematic view of an implementation of a heating device.

FIG. 2 is a schematic side view of the heating device of FIG. 1.

Like reference characters refer to like elements.

DETAILED DESCRIPTION

Figure 3A:
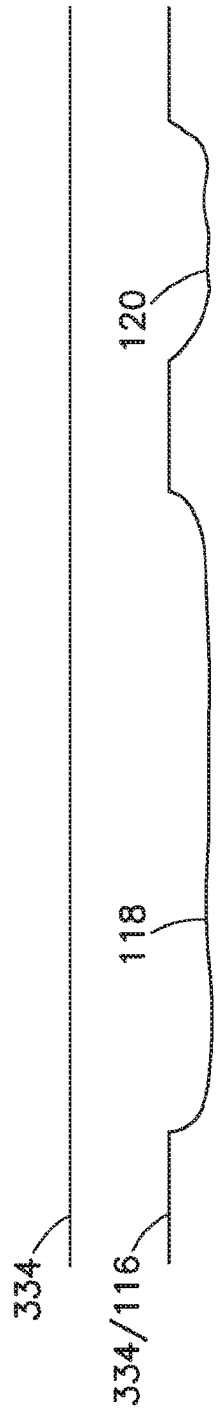
FIGS. 3A-3H are schematic side views that represent a manufacturing process for the heating device in FIGS. 1 and 2.

FIGS. 1 and 2 are schematic views of a heating device 100 that includes a flexible housing 102 that defines a plurality of heater segments 104a, 104b . . . 104h. Each heater segment 104a, 104b . . . 104h has a first compartment 106 that contains a first reactant 109, and a second compartment 108 that contains a second reactant 110. There is a frangible seal 112 between the first compartment 106 and the second compartment 108 in each heater segment 104a, 104b . . . 104h. The first reactant 109 and the second reactant 110 are configured to react exothermically upon contact with one another. In a typical implementation, the first reactant 109 is a granular reactant (e.g., a granular calcium oxide) and the second reactant 110 is a liquid reactant (e.g., water).

To activate heating in one of the heater segments (e.g., heater segment 104a), a user simply squeezes one or both of the compartments 106, 108 in that heater segment 104a. When a sufficient amount of squeezing force has been applied, the resulting pressure inside the heater segment 104a ruptures the frangible seal 112 for that heater segment 104a, which allows the reactants 109, 110 in that heater compartment to mix and react exothermically. Heat from the exothermic reaction can pass through the housing 102 and into an object to be heated, such as a baby bottle (not shown in FIG. 1, but see FIG. 7).

Figure 9:
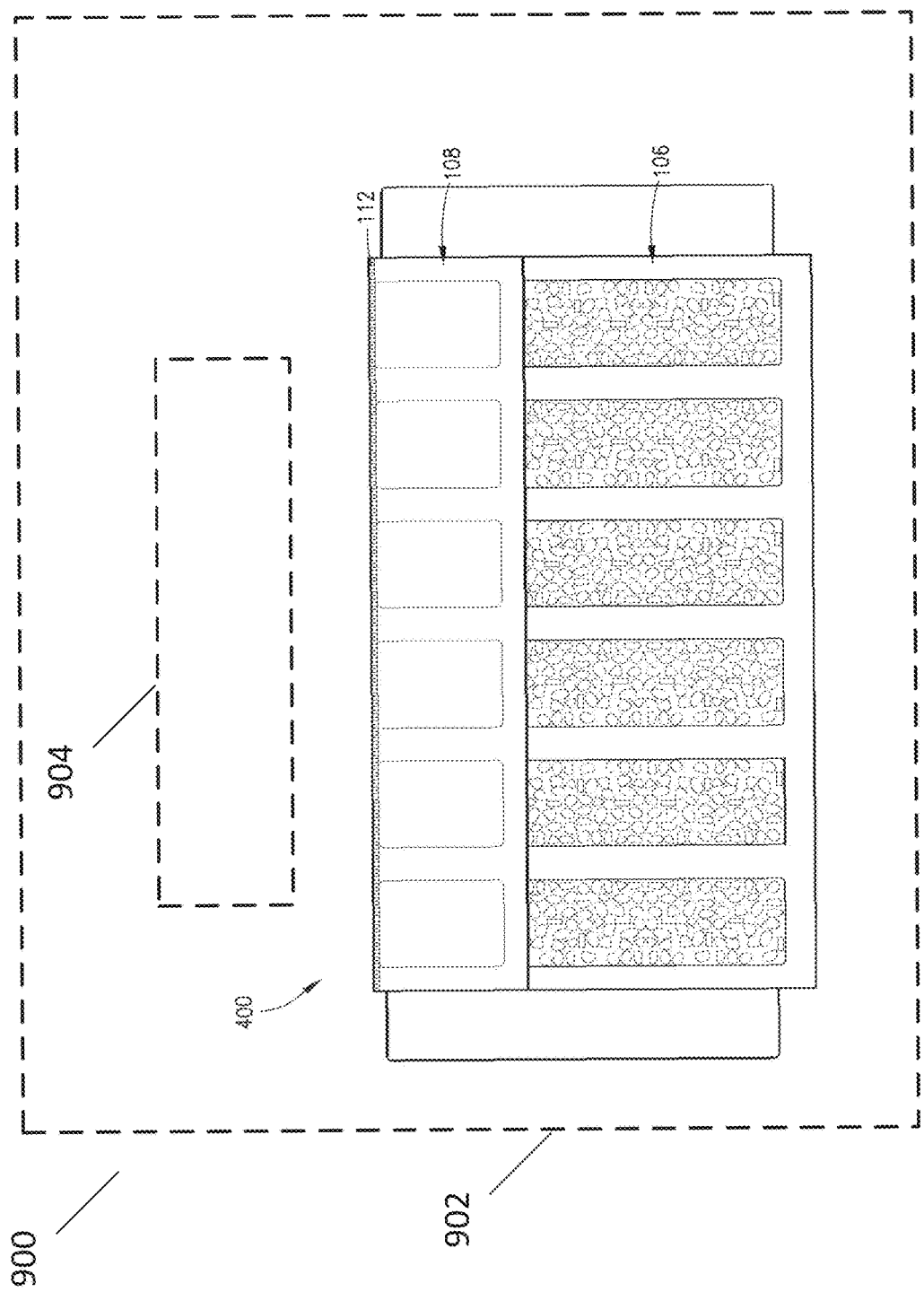
FIG. 9 is a schematic representation of the heating device of FIG. 6 as part of a kit that includes packaging and container for containing a material to be heated.

FIG. 9 is a schematic representation of the heating device 400 of

Figure 6:
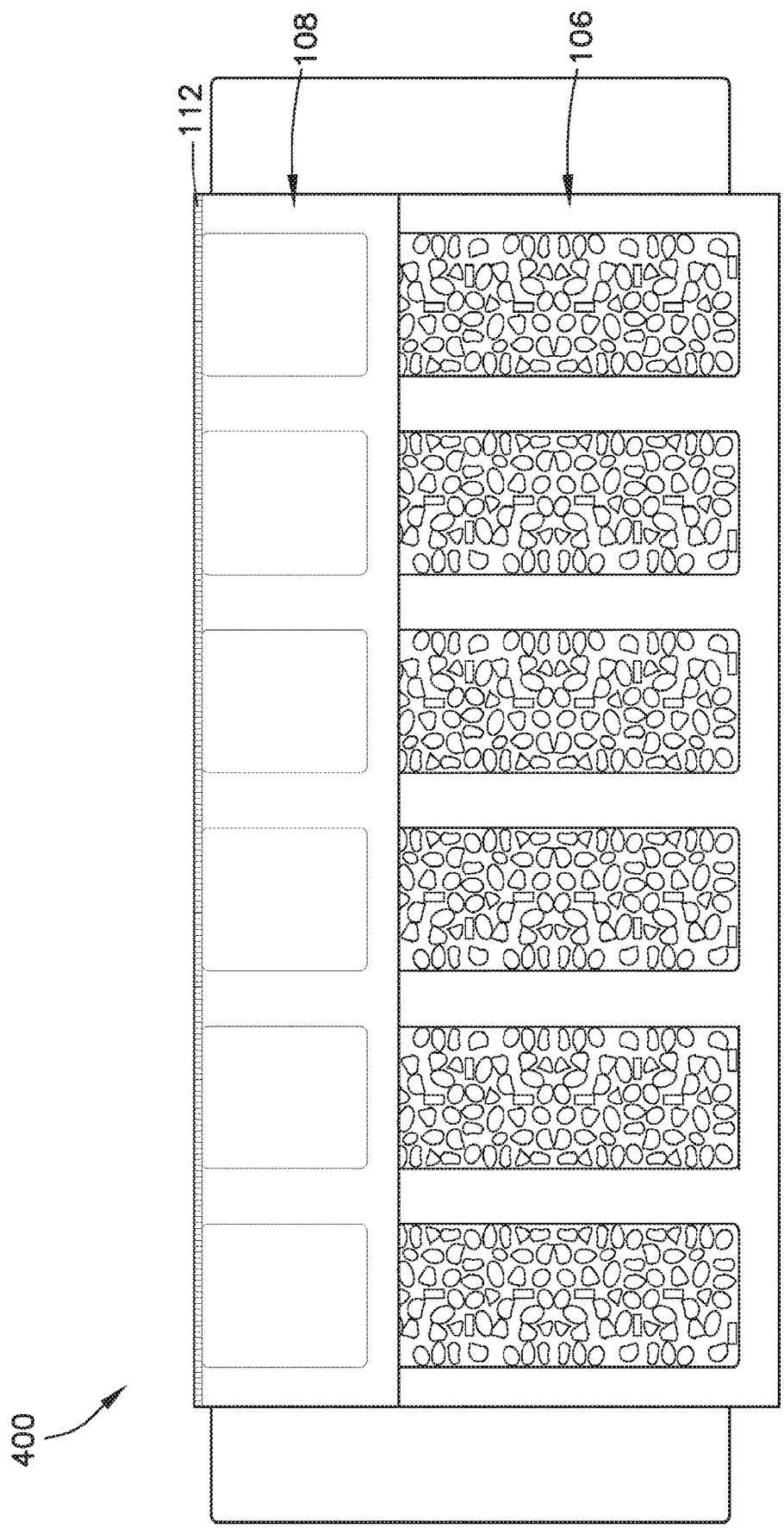
FIG. 6 is a schematic view of the FIG. 4 heating device in alternative configuration.

FIG. 6 as part of a kit 900 that includes packaging 902 and container for containing a material to be heated. As shown, the packaging 902 contains the heating device 400. Moreover, as shown, the heating device is configured inside the packaging 900 with a portion of the heating device that includes the second compartments 108 folded over a portion of the heating device that includes the first compartments 108 at the frangible seals 112. The illustrated kit 900 further includes a container 904 (e.g., a baby bottle) inside the packaging 902. The container 904 is for containing a material to be heated by the heating device 400.

The flexible housing 102 in the illustrated heating device 100 is formed from a flat flexible sheet 114 and a contoured flexible sheet 116 that are coupled to one another. The contoured flexible second sheet 116 is contoured to define a plurality of first pockets 118 and a plurality of second pockets 120. These pockets 118, 120 are configured such that when the contoured flexible sheet 116 is coupled to the flat flexible sheet 114: A) each first compartment 106 is defined by one of the first pockets 118 in the contoured flexible sheet 116 and the flat flexible sheet 114, and B) each second compartment 108 is defined by one of the second pockets 120 in the contoured flexible sheet 116 and the flat flexible sheet 114.

The flat flexible sheet 114 is sealed against the contoured flexible sheet 116 to form the frangible seals 112 between the first compartment 106 and the corresponding second compartment 108 in each heater segment 104a, 104b . . . 104h. Moreover, the flat flexible sheet is sealed against the contoured flexible sheet 116 to form additional ("non-frangible") seals that remain intact when the frangible seals 112 rupture. These additional seals extend around each of the first and second compartments 106, 108 except where the frangible seals 112 are located.

The illustrated heating device 100 has fasteners 122a, 122b that can mate with one another at opposite ends thereof. In use, the heating device 100 can be wrapped around an object to be heated (e.g., a baby bottle) and the fasteners 122a, 122b can be mated with one another to hold the heating device 100 in the wrapped configuration. The fasteners 122a, 122b in the illustrated implementation take the form of mating mechanical hooks formed into the flexible housing 102 material. More specifically, the mechanical hooks have slits that open in opposite directions such that the slits can be aligned with one another and one of the slits can be slid into the other slit to create a mating relationship therebetween. Other implementations may include different types of fasteners.

In the illustrated heating device 100 there is a thermal insulating material 124 (e.g., a thin plastic foam or corrugated cardboard) on an outer surface of the flat flexible sheet 114 opposite the contoured flexible sheet 116. This thermal insulating material 124 inhibits heat from the exothermic reaction from exiting the heating device 100 through the thermal insulating material 124. Accordingly, in a typical implementation, a great deal of the heat generated by the exothermic reaction exits the heating device 100 through the contoured second sheet 116, which, in use, is meant to be in direct physical contact with the object to be heated (e.g., the baby bottle). Meanwhile, the outer surface of the thermal insulating material 124 presents a gripping surface for the heating device 100 and the object wrapped inside the heating device 100 that remains relatively cool to the touch, even when the exothermic reaction is underway and producing heat.

The thermal insulating material 124 can take on any one of a variety of different forms. In some implementations, the thermal insulating material 124 is a separate layer that is coupled to the flexible housing 102 of the heating device 100 by heat sealing or by use of an adhesive material. In some implementations, the thermal insulating material 124 may be applied as a liquid and subsequently cured to solid form.

In some implementations, the heating device has a label (not shown in FIG. 1, but see FIG. 5 and FIG. 7) on an outer surface of the thermal insulating material 124. The label may be either adhered to or printed on an outer surface of the thermal insulating material 124. The label may include a wide variety of printed matter on it including information about the heating device itself (e.g., brand name, slogans, information about proposed uses, etc.) and other types of information normally included on a label for a product.

The flexible housing 102 in the illustrated heating device 100 has a top edge 126, a bottom edge 128, and two side edges 130, 132 that are at opposite ends of the heater segments 104a, 104b . . . 104h. The flexible housing 102 is configured such that the top edge 126 and the bottom edge 128 end up being substantially parallel to one another when the flat flexible sheet 114 is in a planar configuration. The side edges 130, 132 are perpendicular to the top edge 126 and the bottom edge 128.

The first compartments 106 and the second compartments 108 in the heater segments 104a, 104b . . . 104h form an array of compartments between the top edge 126, the bottom edge 128, and the two side edges 130, 132 of the flexible housing 102. More specifically, in the illustrated implementation, the eight first compartments 106 and the eight second compartments 108 form 2×8 array of compartments between the top edge 126, the bottom edge 128, and the two side edges 130, 132 of the flexible housing 102.

The first compartment 106 and the second compartments 108 in each respective one of the heater segments 104a, 104b . . . 104h are aligned with one another in a lengthwise manner along an axis that extends between the top edge 126 of the heating device 100 and the bottom edge 128 of the heating device 100. This axis is perpendicular to both the top edge 126 and the bottom edge 128. Moreover, the axis of every heater segment 104a, 104b . . . 104h is parallel to the axis of every other heater segment 104a, 104b . . . 104h.

The fasteners 122a, 122b are at the side edges 130, 132 of the flexible housing 102.

Spacing between adjacent compartments in the heating device 100 can vary. In a typical implementation, the distance between the compartments in one heater segment and corresponding compartments in an adjacent heater segment is at least 0.5 centimeters. This distance helps ensure that the heating device 100 will be able to be wrapped around the object to be heated (e.g., a baby bottle). Likewise, in a typical implementation, the distance between the first compartment 106 and the second compartment 108 in each heater segment is at least 0.5 centimeters. This distance helps ensure that the portion of the heating device 100 that includes the second compartments 108 can be folded over the portion of the heating device that includes the first compartments 106 at the frangible seals 112. This folding over at the frangible seals 112 can be a desirable configuration for the heating device 100 when it is being shipped because the fold at the frangible seals 112 helps strengthen the frangible seals 112 against inadvertent rupturing during shipping, when the heating device 100 is likely most susceptible to rough handling.

As mentioned above, in some implementations, the first reactant 109 is a granular calcium oxide (or quicklime) and the second reactant 110 is water. These reactants provide a useable amount of heat for applications like warming a baby bottle. Moreover, the reactants themselves are safe and the residue of a reaction between them is innocuous. Calcium oxide (or quicklime) has the appearance and physical properties of a soft rock. It readily reacts with water to form calcium hydroxide.

In a typical implementation, the heating device 100 has provisions for controlling the rate of heat evolution from the exothermic reaction. These provisions minimize or prevent the production of steam inside the heating device 100 during the exothermic reaction. These provisions may include, for example, providing a coating of oil (e.g., vegetable oil or the like) on some portion of the calcium oxide granules in each of the first compartments 106. In a typical implementation, between 40% and 70% of the granular calcium oxide in each of the first compartments 106 is coated with oil, and between 30% and 60% of the granular calcium oxide in each of the first compartments 106 is not coated with oil.

In heating devices that have a mixture of coated (with oil) calcium oxide granules and uncoated calcium oxide granules, the uncoated calcium oxide granules react first because the water is able to reach those granules unobstructed by any coatings of oil. The water does not, however, immediately react with the coated (with oil) calcium oxide granules because the oil coatings prevent the water from contacting those coated (with oil) calcium oxide granules. The heat produced by these first reactions is less than the heat that would have been produced had the water been able to access and start reacting with all of the calcium oxide granules immediately. Over time, the intensity of these initial reactions begins to taper off. Meanwhile, the oil coatings begin to break down gradually exposing more and more of the underlying calcium oxide granules to the water.

The ultimate effect of coating some, but not all, of the calcium oxide granules is to prolong heat production, while reducing peak temperatures. Additionally, in certain implementations, coating some, but not all, of the calcium oxide granules can reduce or even prevent steam generation in the heating device 100. In a typical implementation, these coatings techniques may enable a heater designer to tailor the calcium oxide charge so that heat evolution matches the rate of heat absorption by the target product. Moreover, in some implementations, the rate of heat evolution may be particularly tailored so that the reacting granule bed never goes much above that necessary to heat the milk or food product to body temperature in cool weather. These are very desirable qualities in a heater that might be used to heat a baby bottle or the like.

The size of the first and second compartments 106, 108 can vary. Moreover, the quantity of reactant in each first compartment 106 and each second compartment 108 can vary. However, in some implementations, the granular reactant in the heating device 100 fills between 40% and 60% of each of the first compartments. This percentage fill helps ensure an adequate amount of reactant to generate sufficient heat, while ensuring enough room for the water to flow around the granular reactant.

FIGS. 3A-3H are schematic side views that represent a manufacturing process for the heating device 100 in FIGS. 1 and 2. The figures show only one heater segment of the heating device 100. It should be understood, however, that similar processes as the one represented at each step would be happening for all of the other heater segments in the heating device 100.

FIG. 3A shows a starting point for the represented process, which is simply to provide a flexible sheet 334 that can be used to form the contoured flexible sheet 116 of the heating device 100. In a typical implementation, the flexible sheet 334 is a plastic material. In some implementations, the same flexible sheet 334 that is used to form the contoured flexible sheet 116 of the heating device 100 may be cut or folded to form the flat flexible sheet 114 of the heating device 100 as well.

Figure 3B:
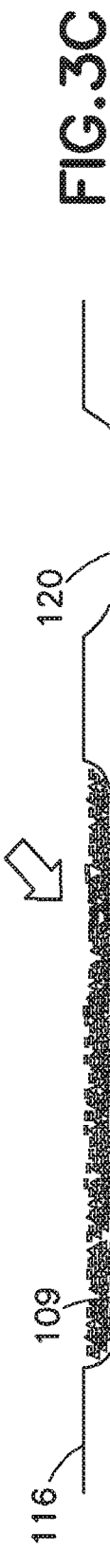

In FIG. 3B, the flexible sheet 334 is shown having been contoured with a first pocket 118 and a second pocket 120 to take the shape of the contoured flexible sheet 116. In some implementation, the pockets 118, 120 are formed in the flexible sheet 334 using a vacuum forming process.

Figure 3C:
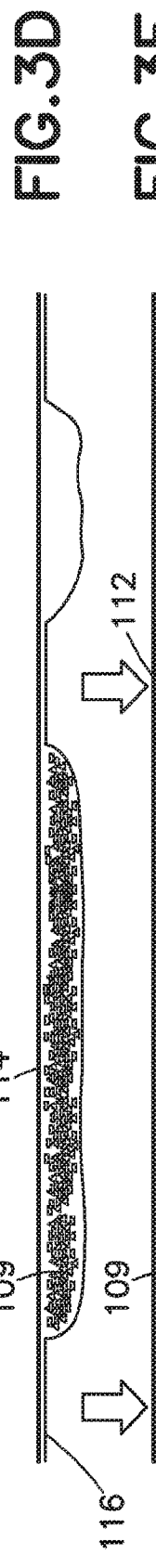

Next, in FIG. 3C, the granular calcium oxide 109 is placed into the first pocket 118 of the contoured flexible sheet 116. In some implementations, this step involves simply pouring a quantity of the calcium oxide granules into the first pocket 118 of the contoured flexible sheet 116. In other implementations, the calcium oxide granules get wrapped-up first in a water-permeable material and then placed into the first pocket 118. Wrapping the granular calcium oxide 109 first helps keep the calcium oxide granules in place within the first pocket 118 of the contoured flexible sheet 116, which is especially important while the first pocket 118 remains in an open configuration (as shown in FIG. 3C), since the contoured flexible sheet 334 may otherwise lack the structural integrity to keep loose granules in place when open. Some examples of suitable water-permeable materials that may be useful in this regard include porous paper material or soft mesh material.

Figure 3D:
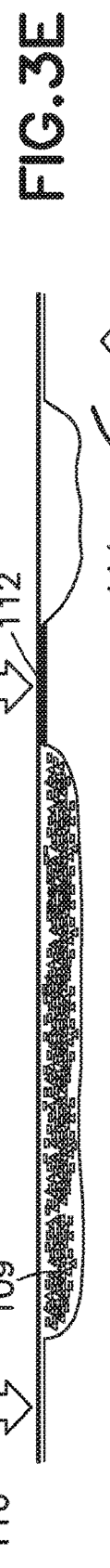

FIG. 3D shows the flat flexible sheet 114 having been placed atop the contoured flexible sheet 116. The flat flexible sheet 114 is sized so that it can cover all of the pockets 118, 120 in the contoured flexible sheet 116 and be sealed onto the contoured flexible sheet 116. In a typical implementation including the one shown in FIG. 3D, the flat flexible sheet 114 is large enough to cover the entire contoured flexible sheet 116 edge-to-edge. In a typical implementation, the flat flexible sheet 114 is the same type of material as the contoured flexible sheet 116 (e.g., plastic).

Figure 3E:
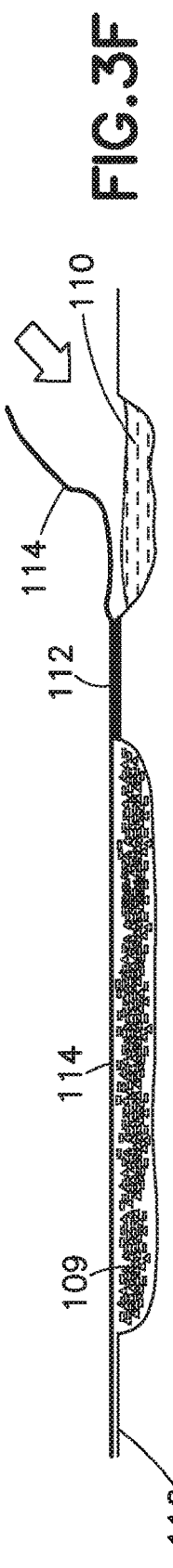

FIG. 3E shows seals being formed between the flat flexible sheet 114 and the contoured flexible sheet 116 around the first pocket 118. Sealing the flat flexible sheet 114 against the contoured flexible sheet 116 around the first pockets 118 forms the first compartment 106 of the heating device 100, which contains the granular calcium oxide 109. The seals being formed in FIG. 3E include the frangible seal 112 between the first compartment 106 and the second compartment 108 of the heating device 100, as well as additional "non-frangible" seals on every other sides of the first compartment 106. The seals may be formed using a heat sealing process or by applying an adhesive material between the sheets 114, 116.

Figure 3F:
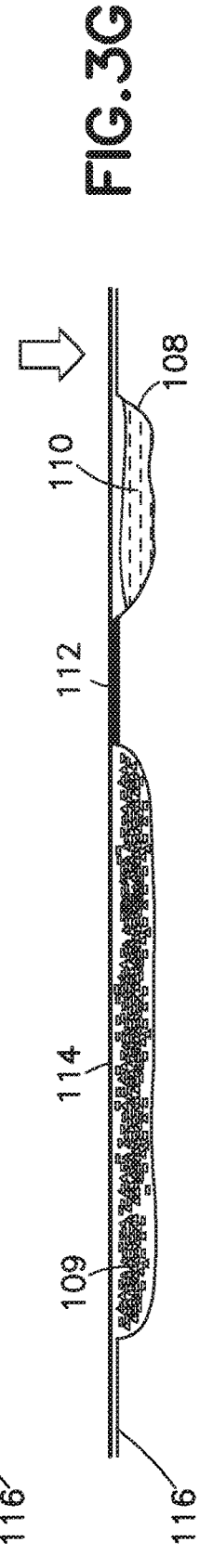

FIG. 3F shows water being introduced into the second pocket 120 of the contoured flexible sheet 116. In the illustrated implementation, the unsealed end of the flat flexible sheet 114 has been lifted off of the contoured flexible sheet 120 to expose the second pocket 120 so that the water 110 could be poured into the second pocket 120.

Figure 3G:
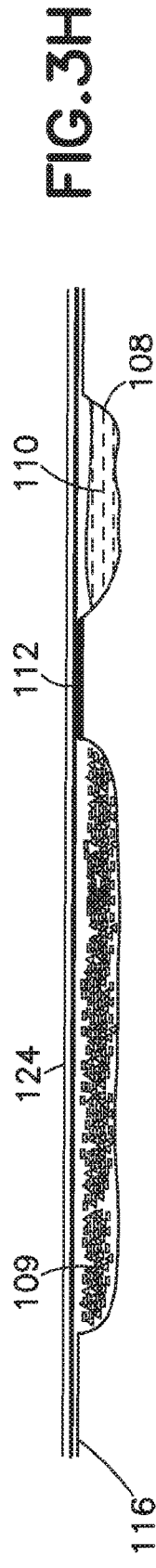

Next, in FIG. 3G, the flat flexible sheet 114 has been repositioned over the second pocket 120 and is shown being sealed against the contoured flexible sheet 116 to close in the second pocket 120 thereby forming the second compartment 108 of the heating device, which contains water. In a typical implementation, this sealing process creates a "non-frangible" seal between the flat flexible sheet 114 and the contoured flexible sheet 116 around the entire second compartment 108 except in the area between the second compartment 108 and the first compartment 106 where the non-frangible seal already has been formed. These seals may be formed using a heat sealing process or by applying an adhesive material between the sheets 114, 116.

Figure 3H:

FIG. 3H shows the thermal insulating material 124 being applied to the outer surface of the flat flexible sheet. In some implementations, the thermal insulating material 124 may be applied as a liquid and subsequently cured to solid form. In some implementations, the thermal insulating material 124 is a separate layer that gets coupled to the flexible housing 102 of the heating device 100 by heat sealing or by use of an adhesive material.

In some implementations, a label may be applied to or printed on the upper, outwardly-facing surface of the thermal insulating material 124.

Figure 4:
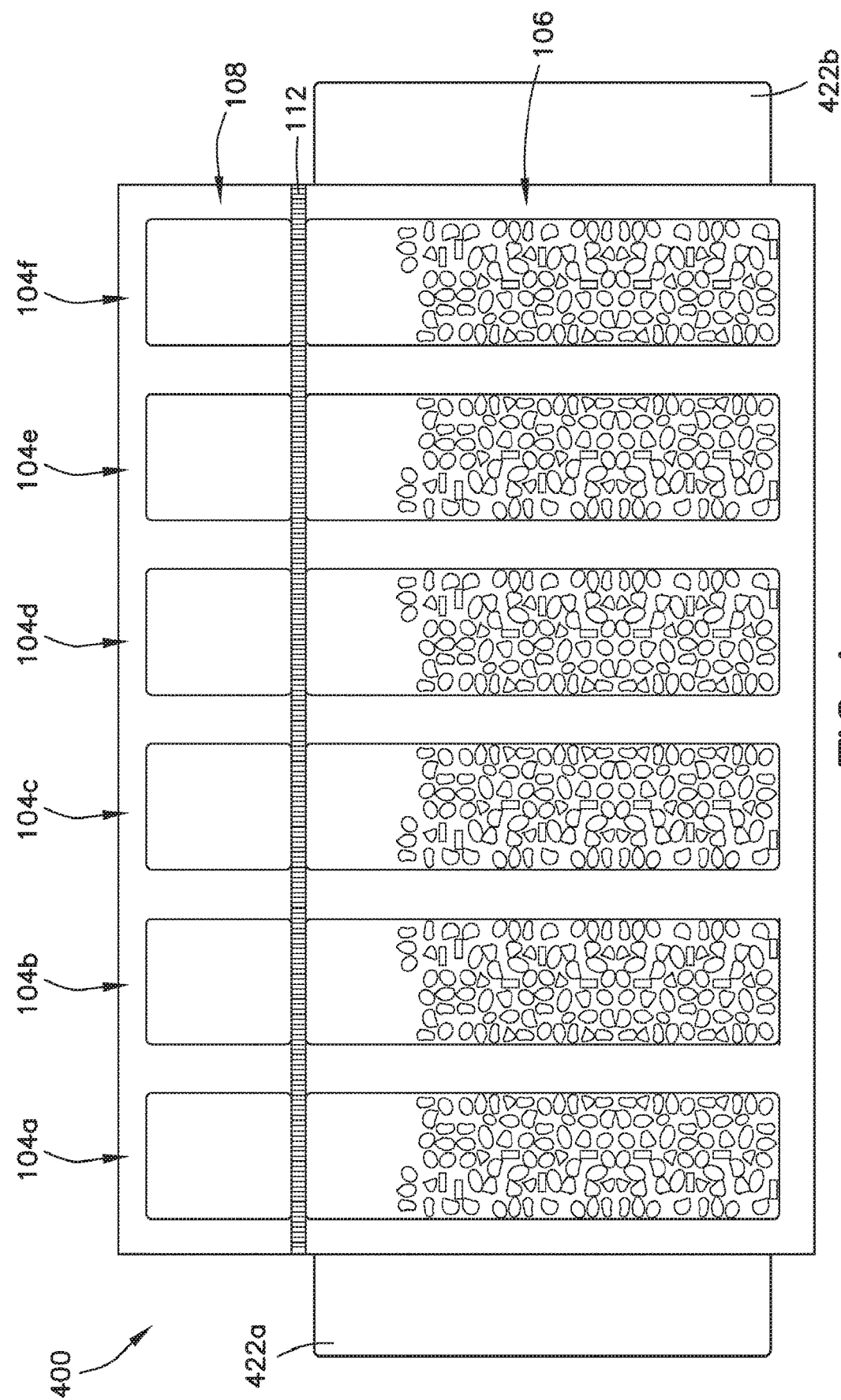
FIG. 4 is a schematic view of an alternative implementation of a heating device.

FIG. 4 is a view of a heating device 400 that is similar to the heating device 100 in FIGS. 1 and 2.

One difference between the heating device 400 in FIG. 4 and the heating device 100 in FIGS. 1 and 2 is that the heating device 400 in FIG. 4 has six heater segments 104a-104f instead of eight heater segments 104a-104h.

Also, the fasteners 422a, 422b in the heating device 400 of FIG. 4 are hook and loop style fasteners unlike the mating mechanical hook fasteners 122a, 122b in the heating device 100 of FIG. 1.

Figure 5:
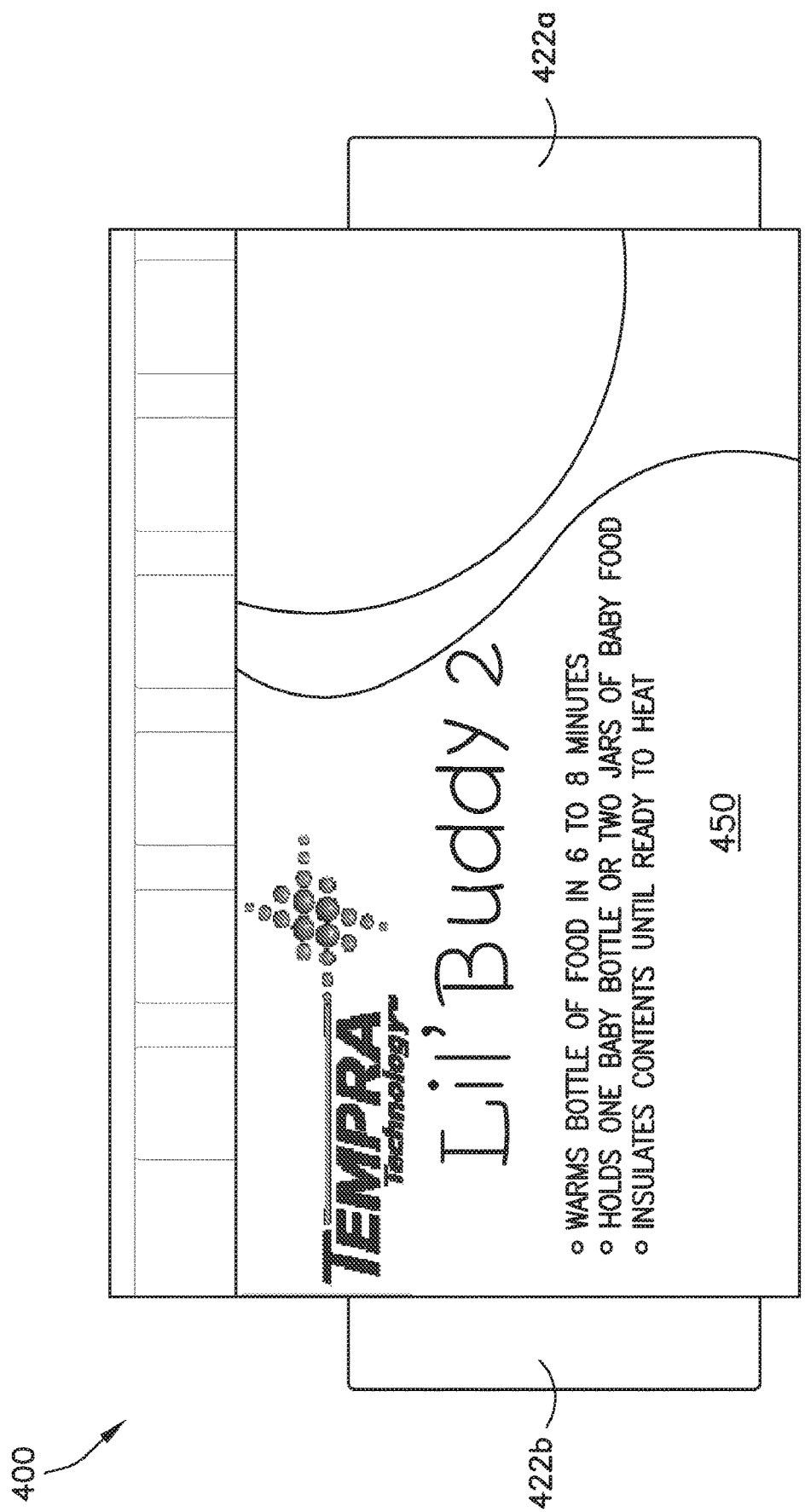
FIG. 5 is an alternative schematic view of the FIG. 4 heating device.

FIG. 5 is alternative view of the heating device 400 from FIG. 4. The view in FIG. 5 is the backside of the view in FIG. 4. FIG. 5 shows an example of a label 500 on the heating device 400.

FIG. 6 is a view of the heating device 400 from FIG. 4 in a different configuration than the one shown in FIG. 4. More specifically, in the FIG. 6 configuration, the portion of the heating device 400 that includes the second compartments 108 is folded over the portion of the heating device 400 that includes the first compartments 106 at the frangible seals 112. This folding over at the frangible seals 112 is desirable as a shipping configuration because the fold at the frangible seals 112 helps strengthen the frangible seals 112 against the possibility of inadvertent rupturing during shipping, when the heating device 400 is likely most susceptible to rough handling. Thus, in a typical implementation, the heating device 400 may be configured as shown, and then packaged (e.g., inside a shipping container or outer wrapping) for shipping.

Figure 7:
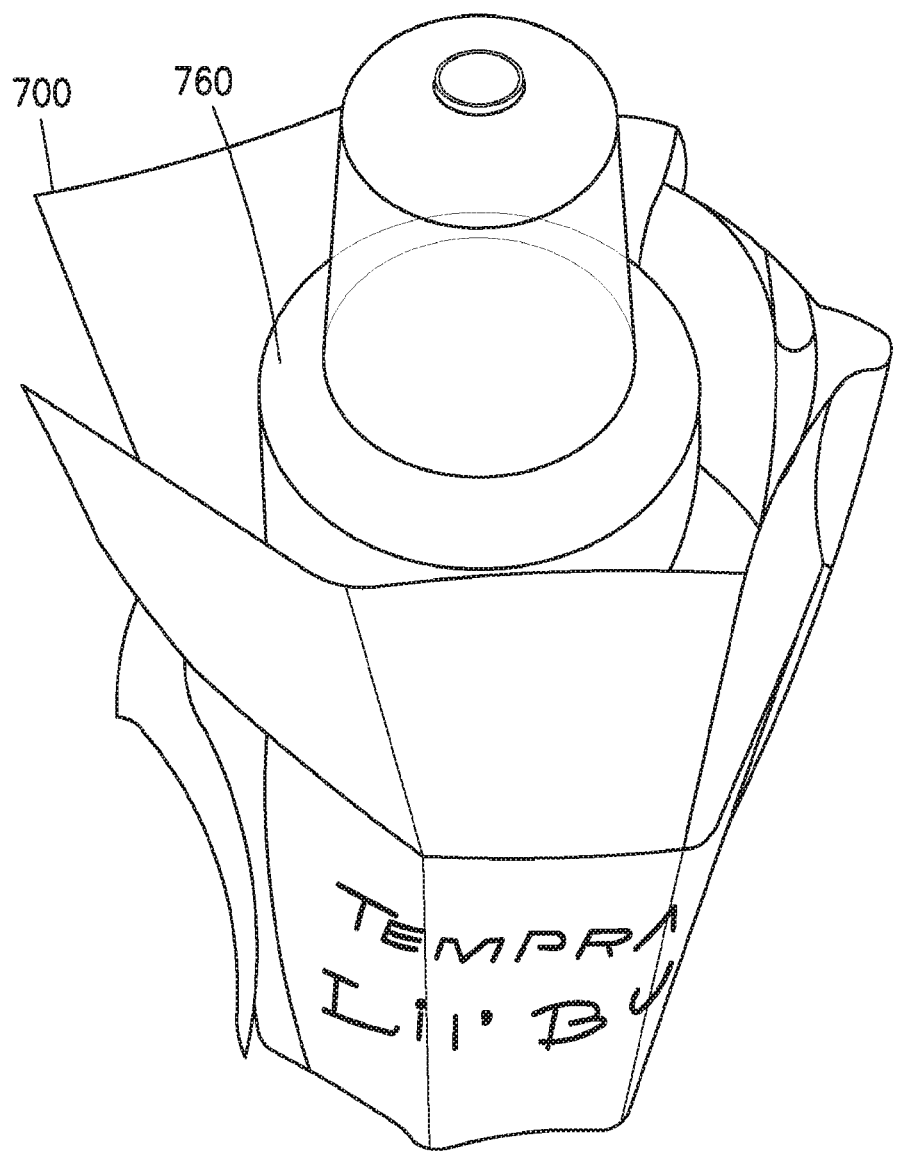
FIG. 7 is a perspective top view of a heating device wrapped around a baby bottle.

FIG. 7 is a perspective view of a heating device 700 wrapped around a baby bottle 760. The heating device 700 in FIG. 7 is the same as the heating device 400 in FIGS. 4, 5 and 6. The wrapped configuration shown in FIG. 7 is a preferred configuration of the heating device 700 for heating a baby bottle 760. More particularly, in the illustrated configuration, the heating device 700 is wrapped around the baby bottle 760 with its label (and thermal insulation) facing in an outward direction and with the external surface of the contoured flexible sheet facing the baby bottle 760. In this configuration, if the frangible seals have not already been ruptured, the heating device 700 can be squeezed to rupture the frangible seals and thereby initiate the exothermic reaction. The outwardly-facing thermal insulation keeps the outer surface/label cool to the touch, with most of the heat from the exothermic reaction exiting the heating device in an inward direction—into the baby bottle 760.

Figure 8:
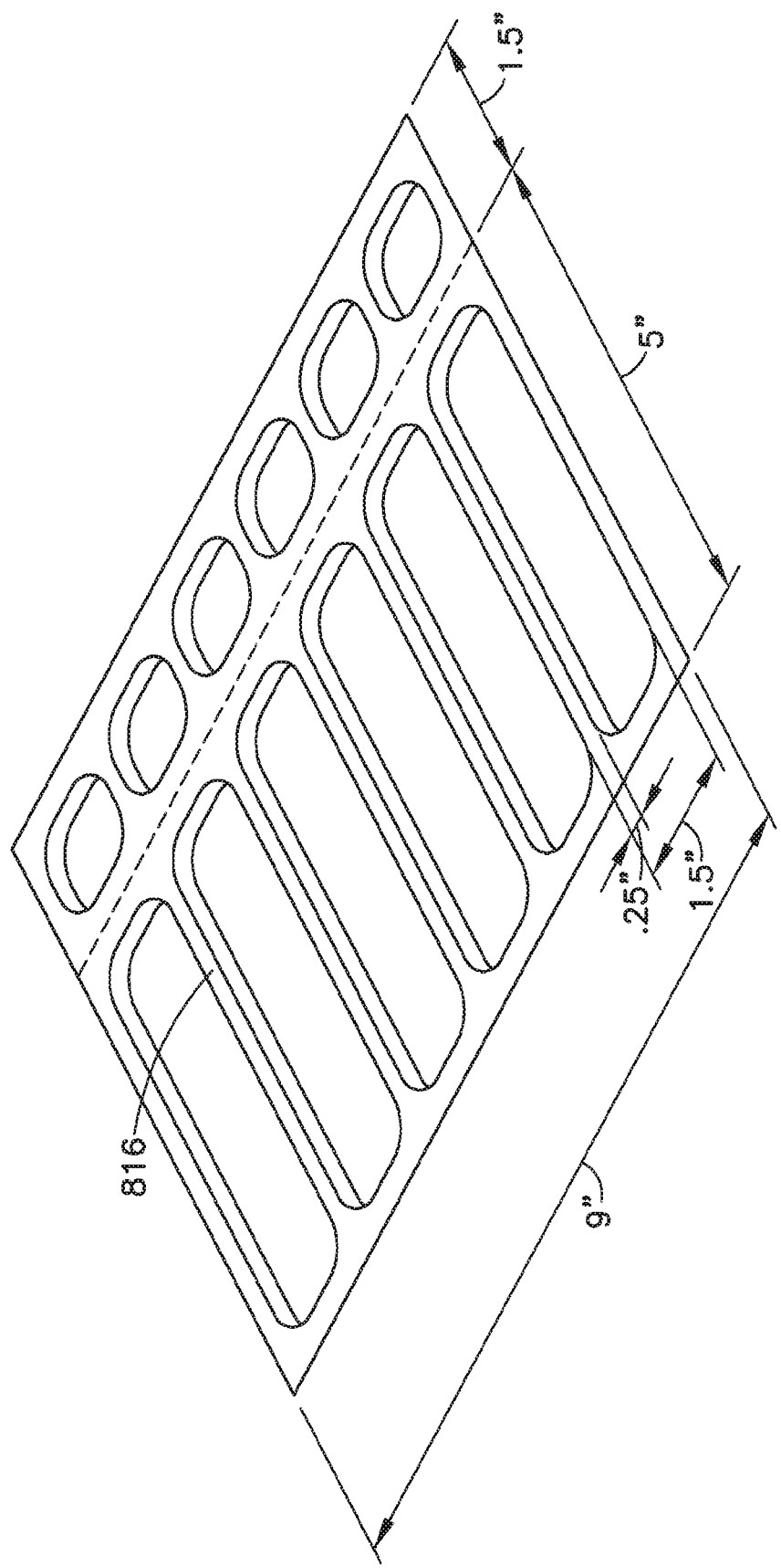
FIG. 8 is a perspective view showing an implementation of a contoured flexible sheet for a heating device with exemplary dimensions.

FIG. 8 is a perspective view showing an implementation of a contoured flexible sheet 816 for a heating device with exemplary dimensions (in inches) for the contoured flexible sheet 816. The dimensions shown, of course, can vary (e.g., +/−10%) depending on specific application considerations. The contoured flexible sheet 816 in the illustrated implementation is for a heating device with six heating segments. The overall side-to-side dimension of the contoured flexible sheet 816 is 9 inches, the overall top-to-bottom dimension of the contoured flexible sheet 816 is 6½ inches. The distance from the bottom of the contoured flexible sheet 816 to the frangible seals location is 5 inches. The distance from the top of the contoured flexible sheet 816 to the frangible seals location is 1½ inches. The distance between pockets in adjacent heater segments is ¼ inch. The distance between one edge of a pocket to a corresponding edge in the next adjacent pocket is 1½ inches. The dimensions shown in this figure should not be construed as limiting the scope of protection being sought; they are simply illustrative of one version of the heating device.

The heating device may be packaged for sale in a variety of ways. In some implementations, the heating device may be packaged for sale as part of a kit that includes the heating device and one or more baby bottles that the heating device can be used with to heat or warm contents of the baby bottle. When shipped, the heating device may be provided (with or without baby bottles) in packaging and configured as shown in FIG. 6, with the portion of the heating device 400 that includes the second compartments 108 folded over the portion of the heating device 400 that includes the first compartments 106 at the frangible seals 112.

A number of embodiments of the invention have been described. Nevertheless, it will be understood that various modifications may be made without departing from the spirit and scope of the invention.

For example, the heating device can be used to warm or heat baby bottles or fluid contained in a baby bottle. However, it also can be used to warm or heat a wide variety of other products.

The specific exothermic reactions mentioned above involve water and calcium oxide. There are other possibilities as well. One of those other possibilities is the exothermic solution of anhydrous calcium chloride in water. This is a rather low energy reaction and may be used to heat very small quantities of product with a comparably bulky heater. Several other chlorides may be used similarly. They all tend to be lower energy and therefore may yield bulkier heaters.

The physical configuration of the heating device can vary. For example, the physical configuration, relative and absolute dimensions, and number of heater segments, compartments, and frangible seals in a heating device can vary. Moreover, the absolute and relative quantities of the reactants and/or the oil coating can vary as well. Several different types of oil and oils having different solubility values are possible.

The types of fasteners can vary—and can include any one or more of a variety of different types of mechanical fasteners including a wide variety of hook designs, hook and loop style fasteners, adhesive materials (peel-away or otherwise), etc.

The heating device can include other features including, for example, soft material near a top edge of the heating device to prevent a baby from accidentally contacting the sharp upper edge of the heating device's flexible housing while drinking from the bottle.

Manufacturing processes can vary. For example, adhesive or hook and loop fastening strips may be added before the device is installed in the final packaging for marketing. Many other manufacture sequences and assembly processes are equally valid. If a mechanical hook design is chosen (e.g., as in FIG. 1) this may be generated as part of the original pouch production.

When the device is applied to a bottle (e.g., as shown in FIG. 7), the granule pouches are pressed tightly against the wall of the bottle containing the material to be heated. The liquid pouches are then squeezed to break the frangible seals and the heating reaction starts. Typically, all of the frangible seals will be broken in this manner. It may be noticed, however, that in very warm weather it may be desirable to initiate less than the maximum number of heaters.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

Other implementations are within the scope of the claims.

What is claimed is:

1. A heating device comprising:
    a flexible housing that defines a plurality of heater segments,
    wherein each heater segment comprises:
        a first compartment containing a first reactant;
        a second compartment containing a second reactant; and
        a frangible seal between the first compartment and the second compartment,
    wherein the first reactant and the second reactant are configured to react exothermically upon contact with one another,
    wherein the flexible housing is formed from a flat flexible sheet and a contoured flexible sheet coupled to one another, the contoured flexible sheet is contoured to define a plurality of first pockets and a plurality of second pockets, wherein the plurality of first pockets and the plurality of second pockets are configured such that: A) each first compartment is defined by one of the plurality of first pockets in the contoured flexible sheet and the flat flexible sheet, and B) each second compartment is defined by one of the plurality of second pockets in the contoured flexible sheet and the flat flexible sheet,
    wherein the flat flexible sheet is sealed against the contoured flexible sheet to form the frangible seal between the first compartment and the second compartment in each of the heater segments, and wherein the flat flexible sheet is sealed against the contoured flexible sheet to form additional, non-frangible seals that remain intact when the frangible seals rupture, the additional non-frangible seals extend around each of the first and second compartments except where the frangible seals are located, and
    fasteners that can mate with one another at opposite ends of the heating device.

2. The heating device of claim 1, wherein the first compartments and the second compartments are arranged in an array on a first side of the flat flexible sheet.

3. The heating device of claim 2, wherein the first compartment in each heater segment extends lengthwise along an axis that is common with an axis of the second compartment in that heater segment.

4. The heating device of claim 3, wherein the axis of every first compartment is parallel to the axis of every other first compartment.

5. The heating device of claim 4, wherein the axis of every second compartment is parallel to the axis of every other second compartment.

6. The heating device of claim 1, further comprising:
    a seal between every one of the heater segments and at least one of the other adjacent heater segments.

7. The heating device of claim 6, wherein adjacent heater segments are far enough apart from one another to allow for wrapping the heating device around a cylindrical object.

8. The heating device of claim 1, further comprising:
    a thermal insulator coupled to an outer surface of the flat flexible first sheet, opposite the contoured flexible second sheet, wherein the thermal insulator covers a portion of the outer surface of the flat flexible sheet that corresponds to at least one of the first compartments and at least one of the second compartments.

9. The heating device of claim 1, wherein the first reactant is a granular reactant and the second reactant is a liquid reactant.

10. The heating device of claim 9, wherein the granular reactant is calcium oxide and the liquid reactant is water.

11. The heating device of claim 9, further comprising:
    a coating of oil covering a portion of the granular reactant in each of the first compartments.

12. The heating device of claim 9, wherein 40%-70% of the granular reactant in each of the first compartments is coated with oil.

13. The heating device of claim 9, further comprising:
    a paper or mesh wrap at least partially surrounding the granular reactant inside each of the first compartments.

14. The heating device of claim 9, wherein the granular reactant fills between 40% and 60% of each of the first compartments.

15. A heating device comprising:
    a first compartment containing a granular first reactant;
    a second compartment containing a liquid second reactant;
    a frangible seal or other flow control mechanism between the first compartment and the second compartment,
    wherein the granular first reactant and the liquid second reactant are configured to react exothermically upon contact with one another; and a coating of oil on a portion of the granular first reactant in the first compartment,
wherein the flexible housing is formed from a flat flexible sheet and a contoured flexible sheet coupled to one another, the contoured flexible sheet is contoured to define a plurality of first pockets and a plurality of second pockets, wherein the plurality of first pockets and the plurality of second pockets are configured such that: A) each first compartment is defined by one of the plurality of first pockets in the contoured flexible sheet and the flat flexible sheet, and B) each second compartment is defined by one of the plurality of second pockets in the contoured flexible sheet and the flat flexible sheet,
wherein the flat flexible sheet is sealed against the contoured flexible sheet to form the frangible seal between the first compartment and the second compartment in each of the heater segments, and wherein the flat flexible sheet is sealed against the contoured flexible sheet to form additional, non-frangible seals that remain intact when the frangible seals rupture, the additional non-frangible seals extend around each of the first and second compartments except where the frangible seals are located, and
fasteners that can mate with one another at opposite ends of the heating device.

16. The heating device of claim 15, wherein 40%-70% of the granular first reactant in the first compartment is coated with oil.

17. The heating device of claim 15, wherein the granular first reactant is calcium oxide and the liquid second reactant is water.

18. A method comprising:
providing a heating device that comprises:
a flexible housing that defines a plurality of heater segments, wherein each heater segment comprises:
a first compartment containing a first reactant;
a second compartment containing a second reactant; and
a frangible seal between the first compartment and the second compartment,
wherein the first reactant and the second reactant are configured to react exothermically upon contact with one another,
wherein the flexible housing is formed from a flat flexible sheet and a contoured flexible sheet coupled to one another, the contoured flexible sheet is contoured to define a plurality of first pockets and a plurality of second pockets, wherein the plurality of first pockets and the plurality of second pockets are configured such that: A) each first compartment is defined by one of the plurality of first pockets in the contoured flexible sheet and the flat flexible sheet, and B) each second compartment is defined by one of the plurality of second pockets in the contoured flexible sheet and the flat flexible sheet,
wherein the flat flexible sheet is sealed against the contoured flexible sheet to form the frangible seal between the first compartment and the second compartment in each of the heater segments, and wherein the flat flexible sheet is sealed against the contoured flexible sheet to form additional, non-frangible seals that remain intact when the frangible seals rupture, the additional non-frangible seals extend around each of the first and second compartments except where the frangible seals are located, and
fasteners that can mate with one another at opposite ends of the heating: device;
wrapping the heating device around a container that contains a material to be heated by the heating device; and
mating the fasteners at opposite ends of the heating device with one another.

19. The method of claim 18, further comprising:
squeezing the heating device to rupture one or more of the frangible seals and thereby initiate heating.

20. The method of claim 18, wherein the flexible housing comprises:
a flat flexible sheet; and
a contoured flexible sheet coupled to the flat flexible sheet, and wherein an outer surface of the contoured flexible sheet is facing the container and an outer surface of the flat flexible sheet is facing away from the container.

21. A kit comprising:
a heating device comprising:
a flexible housing that defines a plurality of heater segments, wherein each heater segment comprises:
a first compartment containing a first reactant;
a second compartment containing a second reactant; and
a frangible seal between the first compartment and the second compartment,
wherein the first reactant and the second reactant are configured to react exothermically upon contact with one another; and packaging containing the heating device,
wherein the flexible housing is formed from a flat flexible sheet and a contoured flexible sheet coupled to one another, the contoured flexible sheet is contoured to define a plurality of first pockets and a plurality of second pockets, wherein the plurality of first pockets and the plurality of second pockets are configured such that: A) each first compartment is defined by one of the plurality of first pockets in the contoured flexible sheet and the flat flexible sheet, and B) each second compartment is defined by one of the plurality of second pockets in the contoured flexible sheet and the flat flexible sheet,
wherein the flat flexible sheet is sealed against the contoured flexible sheet to form the frangible seal between the first compartment and the second compartment in each of the heater segments, and wherein the flat flexible sheet is sealed against the contoured flexible sheet to form additional, non-frangible seals that remain intact when the frangible seals rupture, the additional non-frangible seals extend around each of the first and second compartments except where the frangible seals are located, and
fasteners that can mate with one another at opposite ends of the heating device,
wherein the heating device is configured inside the packaging with a portion of the heating device that includes the second compartments folded over a portion of the heating device that includes the first compartments at the frangible seals.

22. The kit of claim 21, further comprising:
a container inside the packaging, wherein the container is for containing a material to be heated by the heating device.

23. The kit of claim 22, wherein the container is a baby bottle.

24. A heating device comprising:
a flexible housing that defines a plurality of heater segments,
wherein each heater segment comprises:
a first compartment containing a first reactant;
a second compartment containing a second reactant; and
a frangible seal between the first compartment and the second compartment,
wherein the first reactant and the second reactant are configured to react exothermically upon contact with one another,
wherein the flexible housing comprises:
a flat flexible first sheet; and
a contoured flexible second sheet coupled to the first flexible sheet,
wherein the contoured flexible second sheet is contoured to define a plurality of first pockets and a plurality of second pockets such that when the contoured flexible second sheet is coupled to the flat flexible first sheet:
each of the first compartments is defined by one of the first pockets in the contoured flexible second sheet and the flat flexible sheet, and
each of the second compartments is defined by one of the second pockets in the contoured flexible sheet and the flat flexible sheet,
wherein a distance between first pockets in adjacent heater segments is 0.25 inches (+/− 10%) and a distance between second pockets in adjacent heater segments is 0.25 inches (+/− 10%).

* * * * *